(12) United States Patent
Fahrer et al.

(10) Patent No.: US 7,402,007 B2
(45) Date of Patent: Jul. 22, 2008

(54) METHOD OF MACHINING ESSENTIALLY CYLINDRICAL GEAR WHEELS WITH INTERNAL OR EXTERNAL GEARING

(75) Inventors: Siegfried Fahrer, Benningen (DE); Ingo Faulstich, Ludwigsburg (DE); Klaus Peiffer, Ludwigsburg (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 960 days.

(21) Appl. No.: 10/319,303

(22) Filed: Dec. 13, 2002

(65) Prior Publication Data
US 2003/0113177 A1 Jun. 19, 2003

(30) Foreign Application Priority Data
Dec. 14, 2001 (DE) ................. 101 62 823

(51) Int. Cl.
*B23F 5/20* (2006.01)
(52) U.S. Cl. ............... 409/51; 409/26; 409/31
(58) Field of Classification Search ......... 409/1, 409/2, 12, 26, 25, 27, 28, 31, 36, 38, 39, 409/51, 52
See application file for complete search history.

(56) References Cited
U.S. PATENT DOCUMENTS

| 4,575,289 | A | * | 3/1986 | Fischer et al. ......... 409/49 |
| 4,710,076 | A | * | 12/1987 | Boblitt ............ 409/26 |
| 4,714,387 | A | * | 12/1987 | Ohno ............. 409/51 |
| 4,954,027 | A | * | 9/1990 | Faulstich .......... 409/51 |
| 4,961,289 | A | * | 10/1990 | Sulzer ............. 409/11 |
| 4,981,402 | A | * | 1/1991 | Krenzer et al. ....... 409/51 |
| 5,562,372 | A | * | 10/1996 | Baima et al. ........ 409/51 |
| 5,765,974 | A | | 6/1998 | Faulstich |
| 5,800,103 | A | * | 9/1998 | Stadtfeld et al. ....... 409/26 |
| 6,065,910 | A | * | 5/2000 | Egawa et al. ........ 409/51 |

FOREIGN PATENT DOCUMENTS

| DE | 3712454 | 10/1987 |
| DE | 4031559 | 4/1992 |
| DE | 4112122 | 4/1992 |
| DE | 19631620 | 2/1998 |
| JP | 06315825 A | * 11/1994 |

OTHER PUBLICATIONS

English translations of Abstracts from German Patent Applications DE 196 31 620, DE 37 12 454 and DE 40 31 559.
Official Action (with English translation) from German Patent Office in corresponding German Patent Application No. DE 101 62 823.4.

* cited by examiner

*Primary Examiner*—Dana Ross
(74) *Attorney, Agent, or Firm*—Robert L. McDowell (57) ABSTRACT

A method of machining cylindrical gears with internal or external gearing on a machine with a tool wherein a gear is positioned on a machine, the gear having an axis of rotation (D). The gear is then evaluated to establish a gear guiding axis (F) and the position of the gear guiding axis (F) relative to the axis of rotation (D) is determined. The gear is machined by displacing the tool in the direction of the gear guiding axis (F).

8 Claims, 8 Drawing Sheets

$$\overline{M_2M_0} = \overline{M_2'M_0'} = \overline{M_2'M_0''} = X_0$$

Fig. 7

$$\overline{M_2M_0} = \overline{M_2'M_0'} = \overline{M_2'M_0''} = X_0$$

Fig.8

METHOD OF MACHINING ESSENTIALLY CYLINDRICAL GEAR WHEELS WITH INTERNAL OR EXTERNAL GEARING

FIELD OF THE INVENTION

The invention relates to a method of machining essentially cylindrical gear wheels with internal or external gearing wherein the workpiece is machined relative to its guiding axis.

BACKGROUND OF THE INVENTION

An essential prerequisite for satisfactory running of a gear in a gearbox is that the gearing must be produced centrally with its guiding axis, the subsequent axis of rotation in the gearbox, so that the gearing axis and the guiding axis of the gear practically coincide. To do so, the work piece (i.e. gear) to be machined must be aligned on the machining equipment in such a way that the guiding axis of the gear and the axis of rotation of the machine coincide within a given tolerance, because according to the state of the art, the gearing is produced about the axis of rotation of the machine. Thus, as long as the toothed work piece is meshed on the machine, the gearing axis of the work piece and the axis of rotation of the machine coincide.

The alignment process is time consuming, especially with large heavy gears, which may weigh several tons. In an attempt to displace a heavy work piece in a certain direction on the machine, it often moves in another direction, e.g., because of unequal friction over the contact surface. Despite great attempts, there is still no satisfactory method of rapid and reliable alignment of heavy cylindrical gears on the gear cutting machine.

This situation has led to the object of providing a method that will make it possible to ensure with little effort that the gearing axis of a gear practically coincides with the guiding axis of the wheel.

SUMMARY OF THE INVENTION

The present invention comprises a method of machining cylindrical gears with internal or external gearing with a tool on a gear processing machine wherein the gear is positioned on a machine tool, the gear having an axis of rotation (D). The gear is then evaluated to establish a gear guiding axis (F) and the position of the gear guiding axis (F) relative to the axis of rotation (D) is determined. The gear is machined with respect to the gear guiding axis (F), for example, the tool is displaced in the direction of the gear guiding axis (F).

DETAILED DESCRIPTION OF THE PREFERRED EMBODIMENTS

Figure 1:
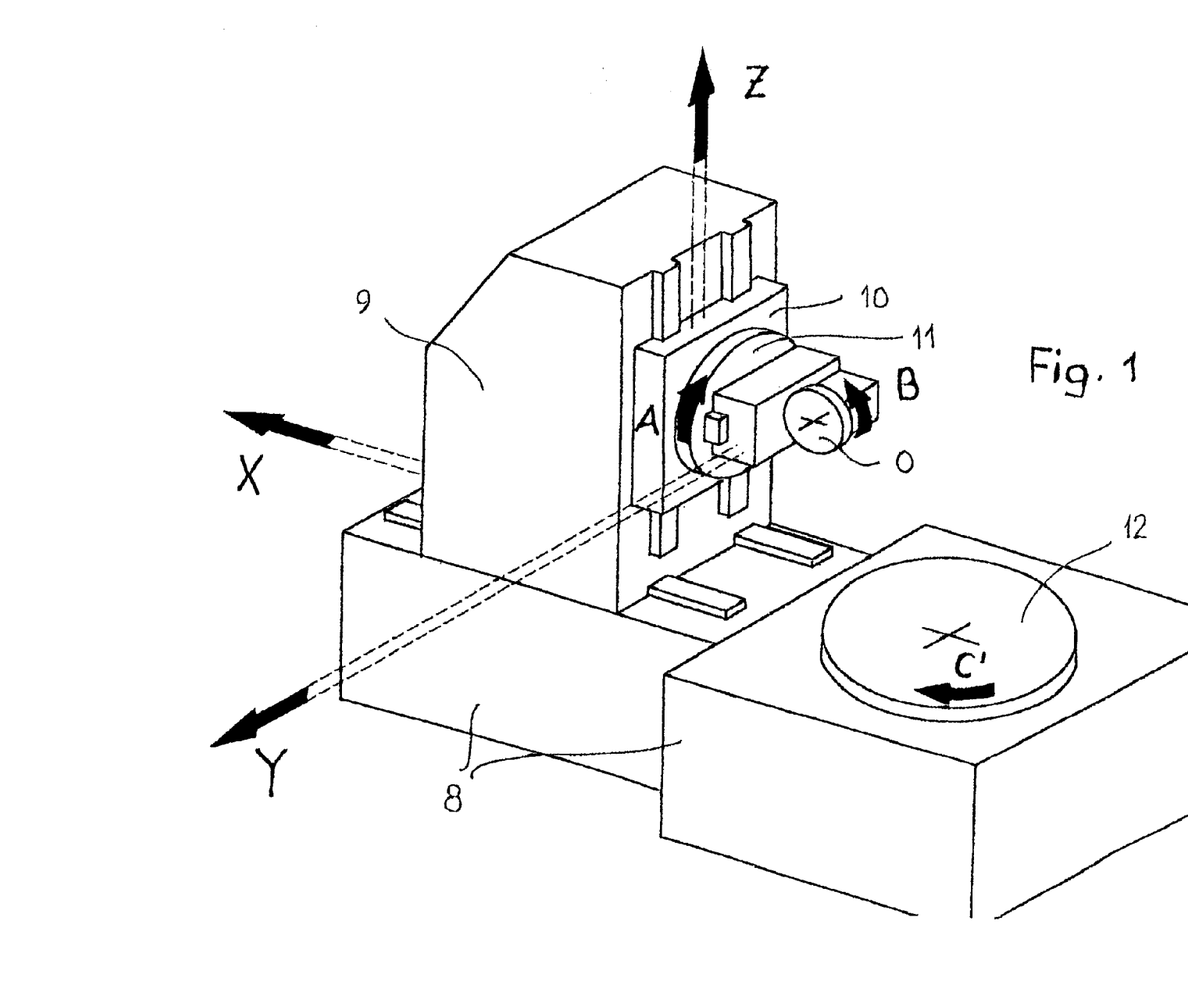
FIG. 1 schematically illustrates machining equipment having three linear axes and three rotary axes for machining gears.

FIG. 1 shows a schematic diagram of the basic design of a gear cutting machine. It has a base 8 comprised of a table bottom part and a stand bottom part on which a radial carriage 9 is movable in direction X. The radial carriage 9 carries an axial carriage 10, which is movable in direction Z. A pivoting head 11, which is pivotable about an axis A, is situated on the axial carriage 10. The pivoting head 11 carries a corresponding tool 0 with a corresponding drive with which tool 0 is rotatable about axis B. The tool is displaceable in the direction of its axis, i.e., in direction Y.

Table 12, which is rotatable about axis C and on which the work piece to be machined is to be accommodated, is situated on the table bottom part. Instead of the angle of rotation C, the angle C' is given in FIG. 1. It holds that C'=−C. The prime notation for one of the axes indicates that movements of this axis are executed by the work piece. A movement of the work piece in C' corresponds to movement of the tool by the same amount C. The tool is indicated here in highly simplified form, only one cylinder is shown.

Figure 2:
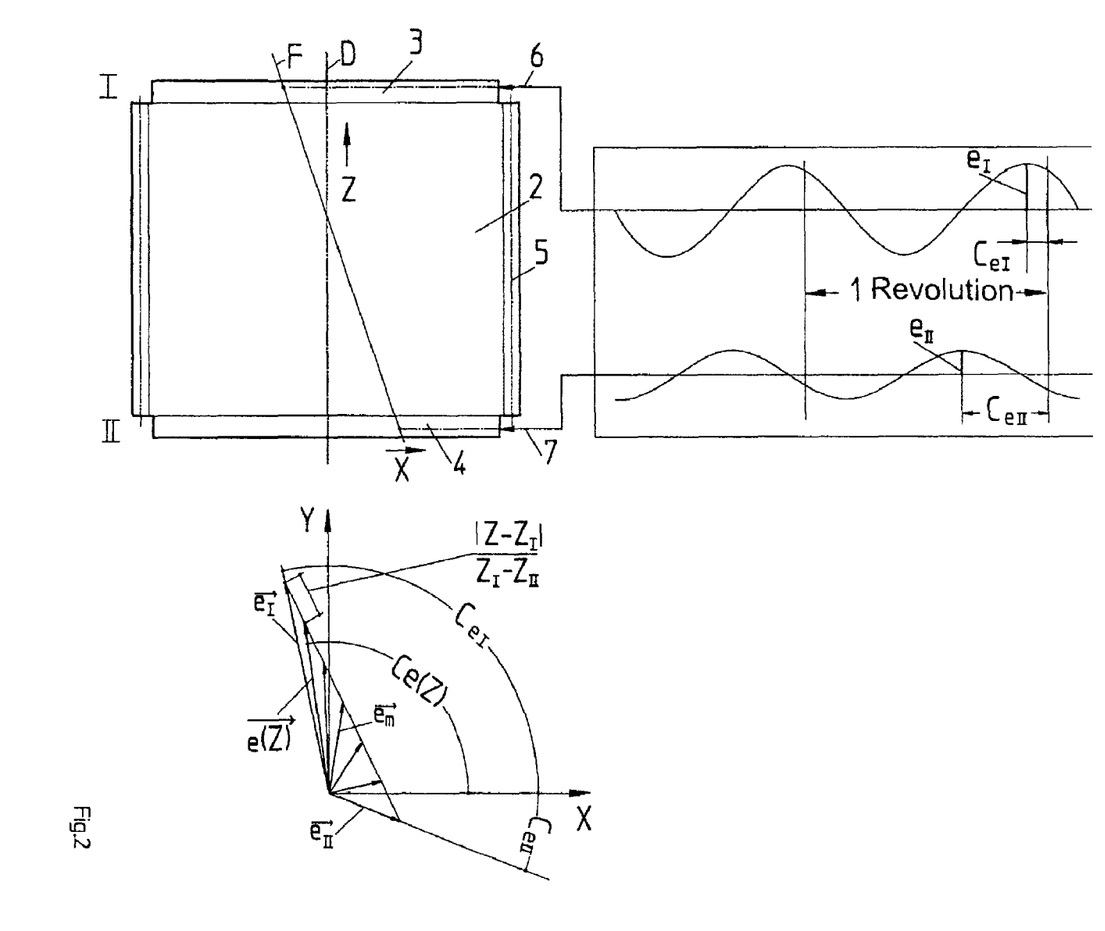
FIG. 2 depicts a method of determining the position of the guiding axis of the workpiece relative to the axis of rotation on a machine such as shown in FIG. 1 and/or FIG. 6.

In FIG. 2, the position of the guiding axis F of gear 2 relative to the axis of rotation D on the machining equipment can be determined, for example, by measuring the radial eccentricity on two test collars 3, 4 and corresponding analysis of the test signals. It is assumed that the a first test collar 3 is mounted above the gearing 5 on the base body of gear 2 and a second test collar 4 is mounted beneath the gearing and that the deflection of the particular touch probe 6, 7 is in the direction of the X axis. The upper measurement plane I is at $Z_I$ and the lower is at $Z_{II}$. It is assumed that gear 2 is rotating while the measured value is being recorded. The measured values are recorded concurrently or successively in the two measurement planes I, II and stored in a computer; they are recorded with a recorder to illustrate the method in FIG. 2.

Each zero crossing of the rotating table (C=0, e.g., at X) is marked in the diagram and/or stored in the computer. A sinusoidal fitted curve through each of the diagrams with one period per revolution is determined. The two signals I and II are plotted so that positive areas characterize "more material" and point "upward" in the diagram. The absolute value and the phase angle of the eccentricity $e_I$ ($e_{II}$) can be read from the peak in diagram I (II), $\vec{e}_I$ and $\vec{e}_{II}$ can be interpreted as vectors and assigned to the rotating table of the machine (for the given work piece in question). This yields a diagram like that in FIG. 2 from which the following can be calculated:

- the eccentricity $\vec{e}_m$ at the middle of the face width of the gear;
- the crossing angle τ between the axis of rotation D and the guiding axis F;
- the eccentricity $\vec{e(Z)}$ for any planes Z perpendicular to the axis of rotation D; and,
- the phase angle $C_e(Z)$.

The following equations hold:

$$\vec{e_m} = \frac{1}{2}(\vec{e_I} + \vec{e_{II}})$$

$$\tau = \frac{|\vec{e_I} - \vec{e_{II}}|}{Z_I - Z_{II}}$$

$$\vec{e(Z)} = \vec{e_I} + (\vec{e_{II}} - \vec{e_I}) \cdot \frac{|Z - Z_I|}{Z_I - Z_{II}}$$

$$C_e(Z) = \arctan \frac{e_y(Z)}{e_x(Z)}$$

where $e_x(Z)$ and $e_y(Z)$ are the components of $\vec{e(Z)}$ in the direction of the X and Y axes, respectively.

If "any" path of the tool relative to the work piece is to be traversed, then in addition to translatory movements in X, Y and Z directions, rotation about the axes A, B and C are necessary. The translatory axes and axes A and C do not require explanation. Rotation about B is necessary to generate the cutting speed in the discontinuous profile methods and in the other methods with a rotating tool without a reciprocating cutting motion such as that which occurs in gear shaping, for example. However, the rotational speed of the tool can normally be varied in a wide range without affecting the geometry created in the work piece. Therefore, this rotation cannot be used to generate "any" movement.

Figure 3:
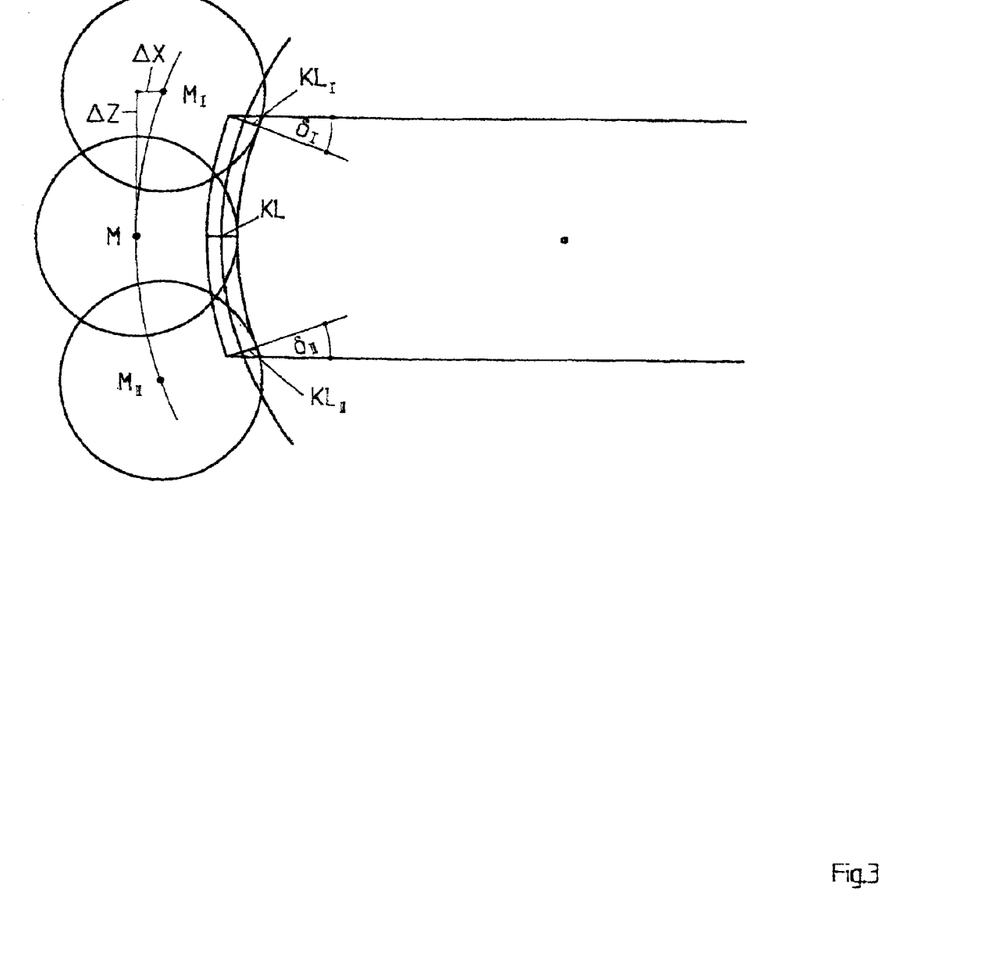
FIG. 3 shows a schematic diagram of various positions of a disk-shaped profile tool relative to a work piece to be machined with crowning in width.

On the basis of an example, it will now be explained what is understood by rotation in the present case. FIG. 3 shows an axial section through a "spur-toothed" coupling gearing in a simplified diagram for the discontinuous profile method with a disk-shaped tool, and at the same time it also shows a view of the tool in the direction of the axis of rotation of the tool for three work piece axial positions of a profile grinding disk. The contact line KL between the tool and the work piece runs horizontally at the center of the tooth width and it is rotated by $\delta_I$ at the top and by $\delta_{II}$ at the bottom in the opposite direction of rotation with respect to the horizontal position. This rotation of contact line KL can be considered as rotation on the non-rotating tool envelope body on the basis of its translatory movement on the path $M_{II}$, M, $M_I$. This rotation about the Y axis, i.e., rotation of the B axis without the component necessary to produce the cutting speed, is needed to describe "any" path of the tool relative to work piece 2. However, the rotation is not programmed via the B axis. Instead, it is obtained automatically, as indicated in FIG. 3, on the basis of the path along which the axis of rotation of the tool moves relative to the work piece during the machining operation.

Because the machine has, to a certain extent, possibilities of movement in the direction of the three translatory degrees of freedom and the three rotary degrees of freedom of a general motion, it is able with suitable programming to generate a cylindrical gearing, the axis of which does not coincide with the axis of rotation on the machine.

It does not matter how the adjustment data ED required for this purpose are determined. For example, one may first assume that rotation of the work piece about the guiding axis F and the displacement of the tool in the direction of the guiding axis F, which must be executed during machining of the work piece, can be implemented directly on the machine. The adjustment data can then be defined according to the state of the art and transferred to the coordinate system actually in use on the machine. To do so, the individual variables are displaced perpendicular to the axis of rotation D, so that the guiding axis F and the axis of rotation D intersect at the center of the tooth width, for example, and then they are tilted by the angle between the guiding axis F and the axis of rotation D, so that the guiding axis F and the axis of rotation D coincide. The work piece can then be machined with the resulting positions, paths and speeds, which are then composed of components in the direction of the actual machine axes.

Figure 4:
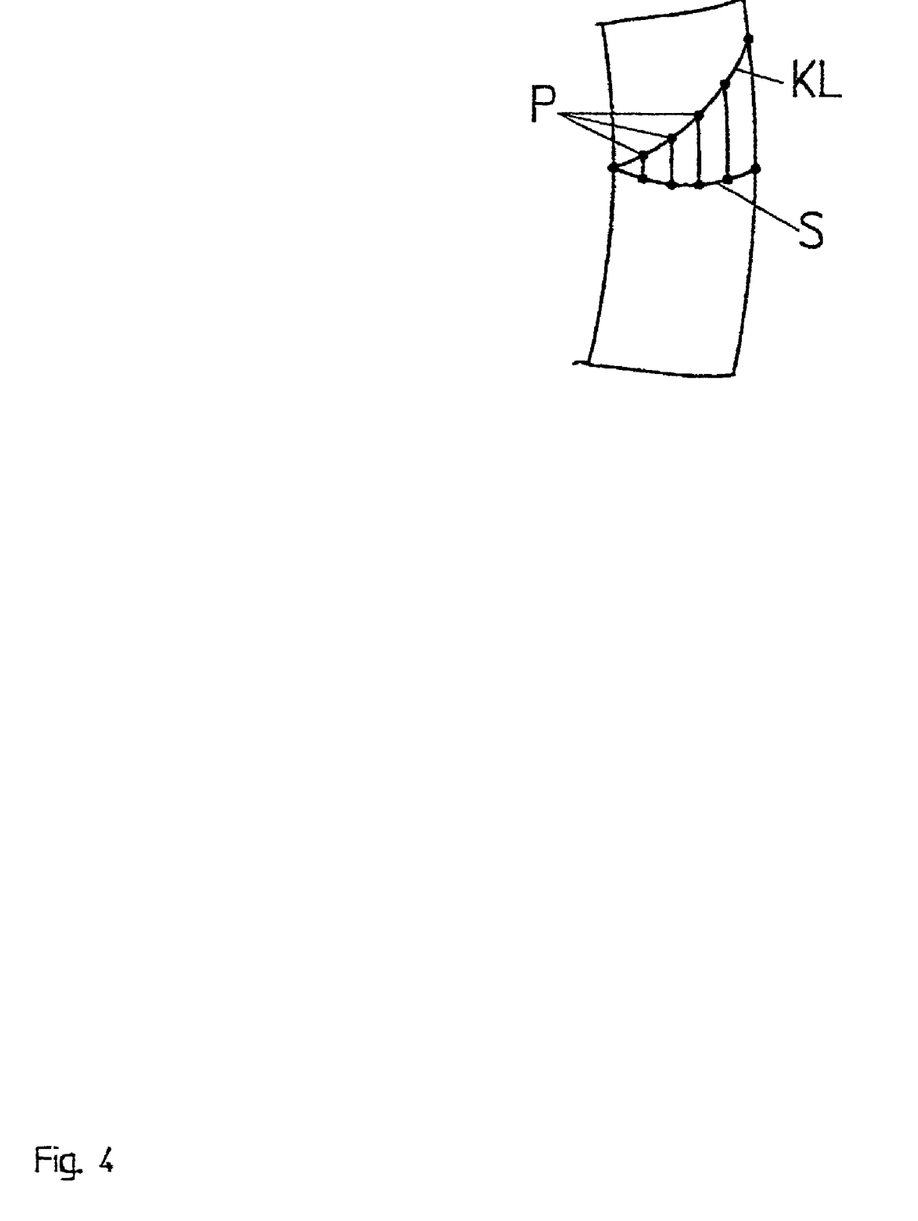
FIG. 4 illustrates a helical cylindrical gearing of a work piece with a contact line KL between the tool and the workpiece and a line of intersection S perpendicular to the guiding axis of the work piece.

The adjustment data ED may also be determined iteratively by computer. One example of doing so is described below for the discontinuous profile process using a disk-shaped tool:

the gearing 5 about the axis of rotation D of the machine is described as usual;

the gearing 5 is displaced and tilted so that the gearing axis and the guiding axis F coincide;

the tool 0 is positioned in the starting position, e.g., with workpiece 2 aligned exactly, as in machining;

the respective contact line KL between the tool 0 and the workpiece 2 is determined, the direction of the respective flank normal being determined from the position of the flanks in the tilted eccentric position (e.g., at a point P on the flank as a cross product of the tangent to the involute curve through P and the tangent to the helical line through P);

the points of the contact line KL in the transverse section S of the gearing 5 are screwed about the guiding axis F (FIG. 4);

the deviations in the profile and the allowance relative to the respective target value are determined; and, correction values in X, Y, Z, A and C are derived from these results iteratively, so that the profile and allowance are within the given tolerances;

the calculation procedure is repeated for axially offset positions and positions that have been rotated according to the helix;

supporting points for the resulting paths are determined from these correction values, and the resulting paths of the tool 0 in the individual gaps are determined by interpolation from these supporting points;

the deviations in the flank line are determined;

correction values in X, Y, Z, A and C are optionally derived iteratively, so that in addition to the profile and allowance, the flank line also lies within the given tolerance, and, the entire procedure is repeated for all toothed gaps.

Figure 5A:
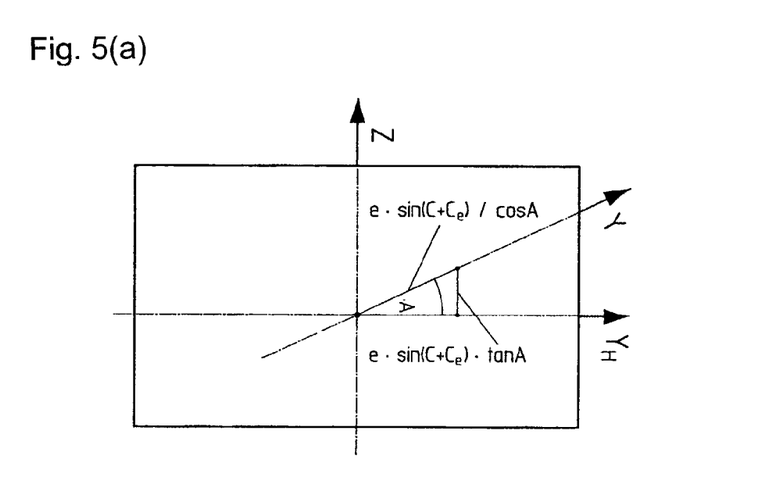
FIGS. 5(a) and 5(b) show correction variables for machining an eccentrically chucked workpiece on a machine such as in FIG. 1.
Figure 5B:
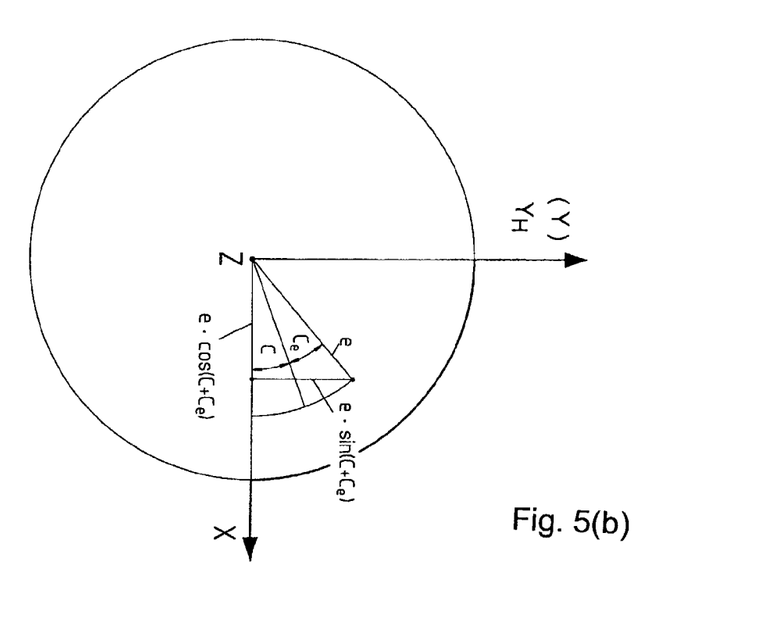

The embodiment explained above pertains to a general deviation in position of the guiding axis F with respect to the axis of rotation D. This position is characterized in that the two axes D and F are skewed relative to one another and they do not intersect. In practice, one special case of false positioning of these axes is of major importance. This case is characterized in that the guiding axis F and the axis of rotation D are parallel to one another at a certain distance e. For this case, the adjustment data ED can be defined easily. All points on the guiding axis F describe a circular path about the axis of rotation D with rotation of the work piece on the machining equipment. However, this movement along the circular path does not consist of a rotation but instead is a strictly translatory movement of the guiding axis F on this circular path. To nevertheless create the gearing 5 centrally with respect to the guiding axis F of the work piece, correction settings are necessary on the machining equipment (see FIGS. 5a and 5b).

The eccentricity, i.e., the distance between the two axes F and D, is determined according to the absolute value e and the phase angle $C_e$ to the zero rotational position of the table of the machining equipment. The angle of rotation C=0 is thus on the X-axis in the example according to FIG. 5b. The following corrections during machining of the eccentric work piece are superimposed on the instantaneous positions of the individual axes with a satisfactorily chucked workpiece:

$\Delta X = e \cdot \cos(C+C_e)$ $\Delta Y = e \cdot \sin(C+C_e)/\cos A$ $\Delta Z = e \cdot \sin(C+C_e) \cdot \tan A$ The position of the guiding axis F of the work piece relative to the axis of rotation D on the machining equipment can be determined by the same method as in the preceding embodiment. In the present special case, however, the eccentricities e in the two measurement planes I and II are equal in absolute value and phase, i.e., the two curves shown in FIG. 2 can be made to coincide in the present case by displacement in the direction of the ordinate.

The equations given here show that when machining a spur toothing, no correction movement in the Z direction is necessary if the tool is designed for a swivel angle A=0 in the usual manner.

For a simple eccentricity of the work piece on the machining equipment, the method described here leads to an accurate solution. In many cases, however, compensation of the central wobble may be omitted in the general case in which the axis of rotation D and the guiding axis F are eccentric and skewed relative to one another, and it is possible to work according to a slightly modified method. This will be explained here for profile grinding using a disk-shaped tool.

Although the method described in the "Background of the Invention" portion is theoretically accurate but complex, an accuracy that is fully adequate is achieved with the inventive method, in particular when the work piece receptacle on the machining equipment has a minor axial run-out and the axial contact surface of the work piece is fabricated in a tight tolerance perpendicular to the guiding axis F. In this method, as in the method explained in the above "Background" portion, the position of the gear wheel guiding axis F relative to the axis of rotation D on the machining equipment, for example, is determined by measuring the radial eccentricity in the measurement planes I and II.

However, the eccentricity $\bar{e}$ is determined not only in the two measurement planes I and II, but also, as explained above, by calculation for intermediate planes perpendicular to the axis of rotation D. In each intermediate plane, first the method described previously for a parallel position of the guiding axis F to the axis of rotation D is used, although using the absolute value e(Z) and the phase angle $C_e(Z)$ of the eccentricity in each plane. This data is then used to describe the gearing by computer, and the deviations in profile and flank line about the guiding axis F are determined. If the results show unacceptably great deviations, they are compensated dynamically with known means. The known means are described in German Patent 41 12 122 C2, for example. These means are applied to supporting points, which are combined into paths for the final machining by interpolation and thus result in the dynamic change in the adjustment data. For example, a false adjustment ΔA leads to a profile slope deviation having the same sign on both flanks of the work piece. These profile slope deviations can be avoided by means of a correction in the distance between the axes. However, this changes the thickness of the teeth, and because it changes over the width of the teeth, it also changes the flank line deviation. If this results in exceeding the tolerance, then at least the finishing cut must be made in single-flank machining.

As an alternative, however, a dynamic adjustment of the swivel angle may also be made. However, this would be different in each C position of the table. With the correction values thus determined, the final machining of the gearing is then performed on the work piece. In this method, there remains a very slight fluctuation in the crowning in height over the circumference of the work piece. This is unavoidable. If it becomes too great in the exceptional case, the tool may be designed so as to produce a slight positive crowning in profile, so that the crowning in height cannot become negative. However, in the case of workpieces that are to have a crowning in profile anyway, the fluctuation mentioned here disappears in the tolerance.

The inventive method may also be used in the case of a workpiece having spur toothing which is to be machined with a disk-shaped tool by the profile method, whereby the guiding axis F and the axis of rotation D of the machining equipment are eccentric and skewed relative to one another. This results in extremely simple solutions, because the workpiece does not rotate during machining. The guiding axis F is projected into the Y-Z plane and the required movement $\Delta Y = f(Z)$ is determined from this for the corresponding tooth gap. In addition, the guiding axis F is projected into the X-Z plane and the required movement $\Delta X = f(Z)$ is determined from this for the corresponding tooth gap. In the present case, ΔX and ΔY are each proportional to Z and the proportionality factors are different in each angular position C of the table.

Figure 6:
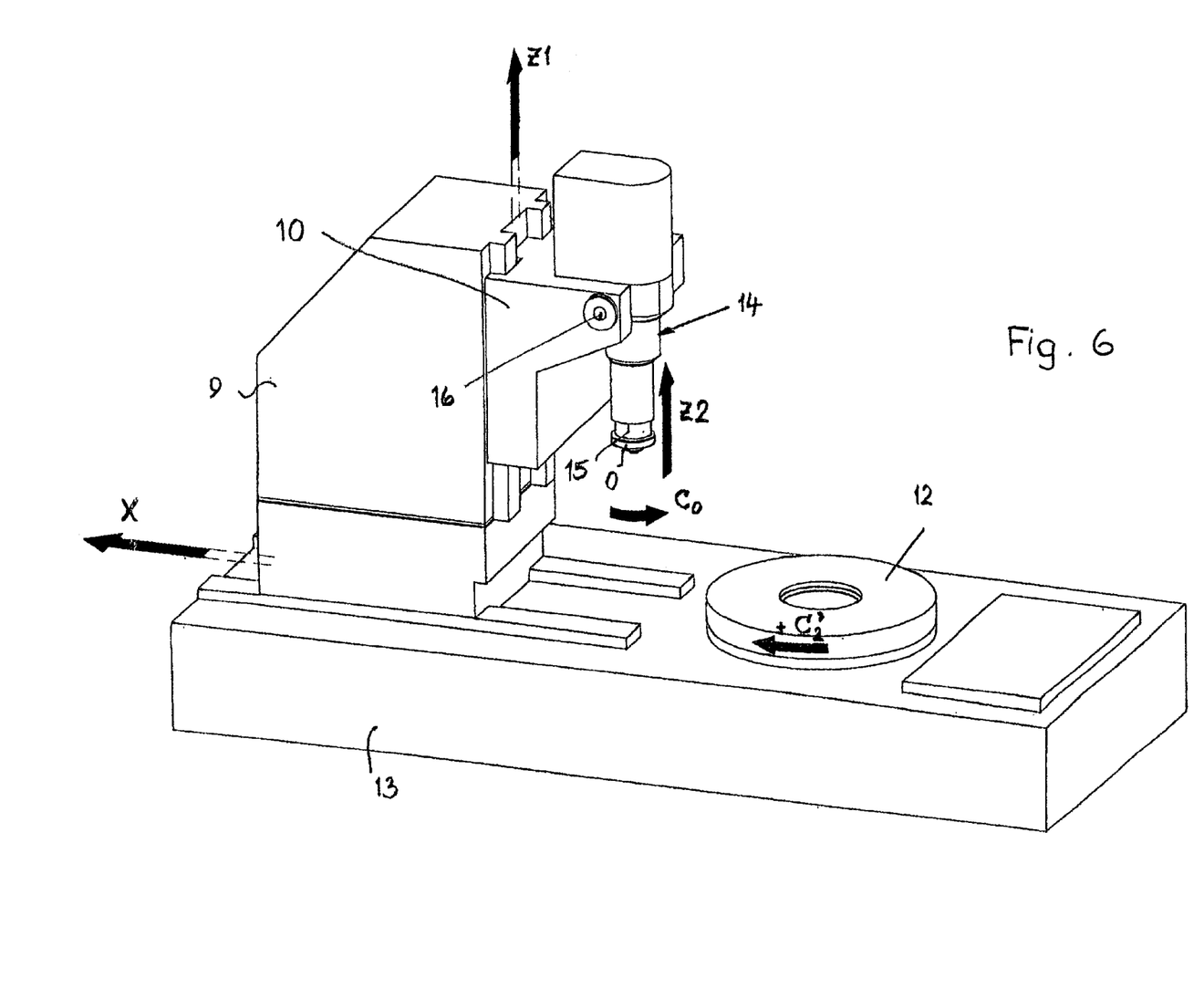
FIG. 6 schematically illustrates machining equipment with two linear axes and two rotary axes for machining gears with internal and/or external gearing.

Generating shaping and profile shaping machines normally have at least the axes X, Z, $C_0$, and $C_2$. FIG. 6 shows a schematic diagram of the basic design of a generating shaping machine, which has a bed 13 on which a radial carriage 9 can travel in X direction. The radial carriage 9 carries an axial carriage 10 that can be positioned in Z1 direction. The axial carriage 10 carries a shaping unit 14, which is positioned with the axial carriage 10 in Z1 direction. In addition, the shaping unit 14 has a shaping spindle 15, which carries a corresponding tool 0 and can execute a reciprocating cutting movement in Z2 direction independently of Z1 during the machining operation. In order for tool 0 to be disengaged from the workpiece to be machined in the return stroke movement, the shaping unit 14 is mounted on the axial carriage 10, pivotable about an axis 16 perpendicular to the Z1/Z2 direction. The workpiece to be machined, optionally with the help of a chucking device, is accommodated on a rotating table 12 which is rotatable about the C2' axis. The method according to this invention can also be carried out on such machines.

Figure 7:
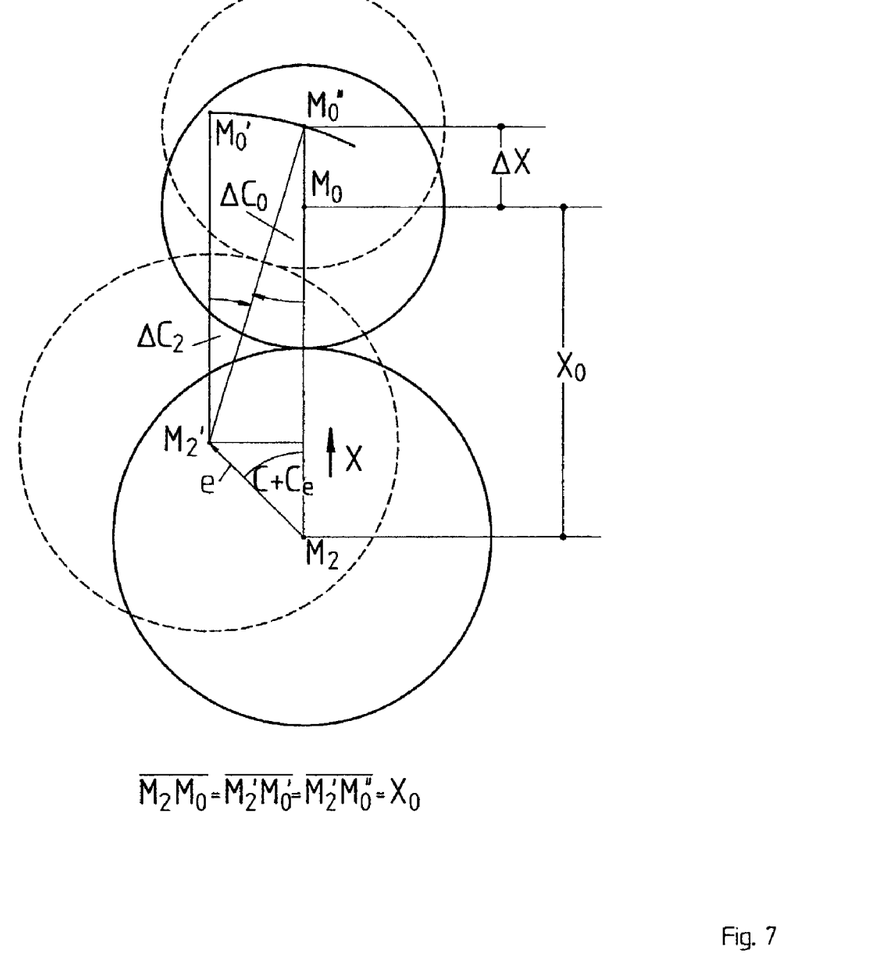
FIG. 7 shows correction values for machining an eccentrically chucked workpiece with external gearing on a machine such as in FIG. 6.

If the guiding axis F and the axis of rotation D run parallel to one another, the distance e of these axes (eccentricity) and the phase angle $C_e$, e.g., on the machine, must be determined. The required corrections can be derived from FIG. 7. In the position indicated with the dotted line, the guiding axis has been displaced from position $M_2$ into position $M_2'$. If the machine were to also have a Y axis in addition to the X axis, $M_0$ could also be displaced to $M_0'$. In fact, however, $M_0$ can be displaced only in direction X. This displacement must be so great that the distance between the guiding axis of the workpiece and the axis of rotation of the work piece, i.e., $\overline{M_2'M_0''}$, is equal to the nominal distance between axes $X_0$ with a perfectly aligned work piece. $\overline{M_2'M_0''}$ does not run parallel to $\overline{M_2M_0}$. Both the tool and the workpiece must therefore execute a corrective rotation. $\Delta C_0$ and $\Delta C_2$ have the same absolute value and the same sign. Thus, if C=0 is on the X axis, it holds that:

$$\Delta C_0 = \Delta C_2 = -\arcsin \frac{e \cdot \sin(C+C_e)}{X_0} \approx \frac{-e \cdot \sin(C+C_e)}{X_0}$$

$\Delta X = e \cdot \cos(C+C_e) - X_0 \cdot (1 - \cos \Delta C_2)$

If the guiding axis F and the axis of rotation D are not parallel to one another but instead are skewed, the method is easy to modify. The eccentricity and phase angle in this case are to be determined again as a function of the position of the respective transverse plane Z. Then in the equations for machining with strictly eccentric chucking, only e is to be replaced by e(Z) and $C_e$ by $C_e(Z)$.

Figure 8:
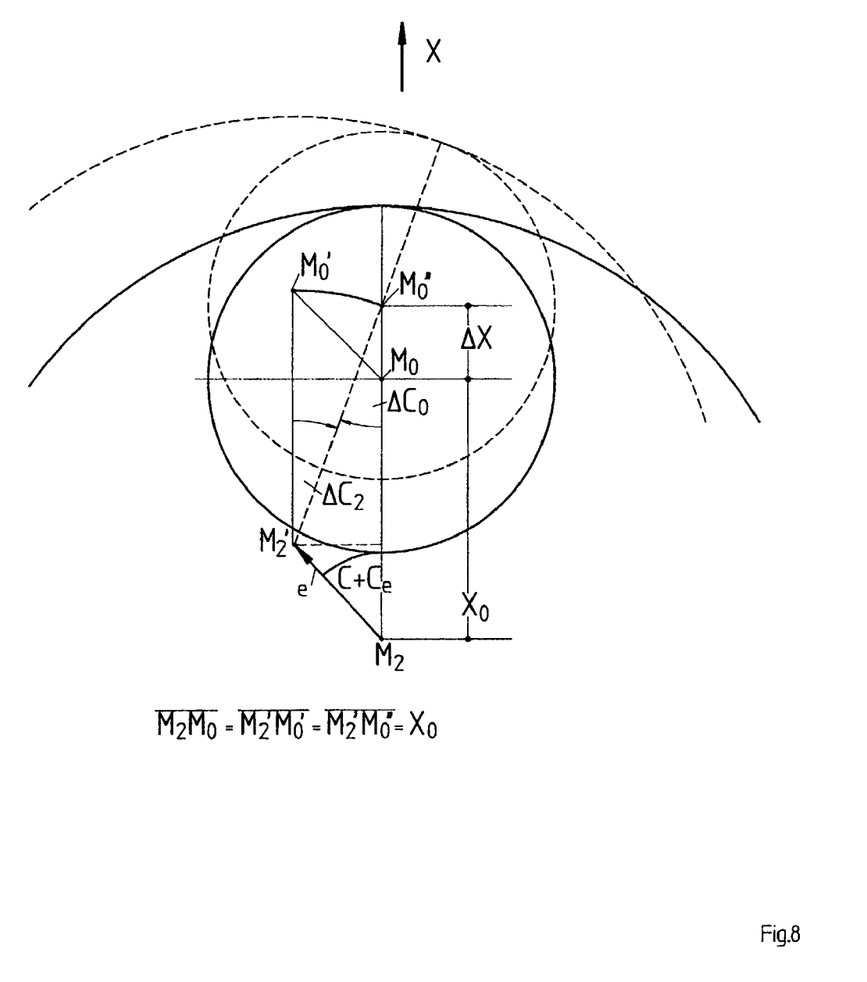
FIG. 8 shows correction values for machining an eccentrically chucked workpiece with internal gearing on a machine such as in FIG. 6.

As shown in FIG. 8, the same equations hold for internal gearing such as that produced in the profile shaping method or in the generating shaping method as for external gearing.

With the methods described here, the gearing is produced about the guiding axis F, which is optionally eccentric and skewed relative to the axis of rotation D of the machining equipment. This procedure can be used in general for workpieces in which at least one profile is to be generated on the circumference in the direction of its axis to be defined or is to be screwed about it when this axis on the machining equipment does not correspond to the axis of rotation of the machine. These methods can also be applied to other fabrication methods, e.g., cutting teeth on worm gears. It can also be applied to methods of machining extremely conical "cylindrical gears" (so-called beveloid gearing), bevel gears, contrate gears, etc.

The basic principle of this invention can be applied even to cases in which the guiding axis F, which is to be the axis of rotation in the gearbox, is not to coincide with the axis of rotation D in fabrication. This is the situation, for example, in the case of elliptical gears, which are fabricated about an axis through the midpoint of the ellipse but rotate about one of the two focal points in the gearbox.

In the embodiments described and illustrated here, the linear axis and to some extent also the rotary axes are perpendicular to one another. These methods can of course also be implemented on the machines in which the axes are not perpendicular to one another. The only condition is that the linear and rotary axes do not lie in one plane and that no two of the linear and/or rotary axes are parallel to one another.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining a cylindrical gear with internal or external gearing on a gear processing machine having axes and a tool, said gear having a face width, said method comprising:
   positioning said gear on said gear processing machine, said gear having an axis of rotation (D),
   evaluating said gear to establish a gear guiding axis (F),
   determining the position of the gear guiding axis (F) relative to the axis of rotation (D), and,
   machining said gearing by displacing the tool in the direction of the gear guiding axis (F).

2. The method of claim 1 further comprising:
   defining adjustment data (ED) and applying said adjustment data to the coordinate system of said machine so that the gear guiding axis (F) and the axis of rotation (D) intersect at the center of the face width of the gear;
   tilting the gear about the point of intersection of the gear guiding axis (F) and the axis of rotation (D) by an amount corresponding to the angle between axes of the gear guiding axis (F) and the axis of rotation (D), so that the gear guiding axis (F) and the axis of rotation (D) coincide, and
   machining said gear whereby positions, paths and speeds necessary for machining are composed of components in the direction of the axes on said machine.

3. The method of claim 1 wherein the gear guiding axis (F) is oriented parallel to the axis of rotation (D), said method further comprising:
   determining eccentricity according to an absolute value (e) and a phase angle ($C_e$),
      where: e=distance between guiding axis (F) and axis of rotation (D),
      $C_e$=phase angle between the gear and a zero-position on the machine, and
   machining the gear while superimposing corrections on instantaneous positions of individual machine axes according to:
   $\Delta X = e \cdot \cos(C+C_e)$
   $\Delta Y = e \cdot \sin(C+C_e)/\cos A$
   $\Delta Z = e \cdot \sin(C+C_e) \cdot \tan A$
   whereby the angle of rotation C=0 lies on the X axis.

4. The method claim 1 further comprising:
   determining the position of the gear guiding axis (F) relative to the axis of rotation (D) by means of e(Z) and $C_e(Z)$,
      where: Z is a plane perpendicular to the axis of rotation (D), and
      $C_e(Z)$ is a phase angle of eccentricity $\vec{e(Z)}$ in the plane (Z),
   superimposing corrections on instantaneous positions of individual machine axes (X,Y,Z) during the machining of the gear,
   whereby when the angle of rotation C=0 lies on the X axis, the corrections in respective plane (Z) are:
   $\Delta X(Z) = e(Z) \cdot \cos(C + C_e(Z))$
   $\Delta Y(Z) = e(Z) \cdot \sin(C + C_e(Z))/\cos A$
   $\Delta Z(Z) = e(Z) \cdot \sin(C + C_e(Z)) \cdot \tan A$.

5. The method of claim 1 wherein the machining method is a profile shaping method or generating shaping method.

6. The method of claim 1 wherein the machining method is a profile shaping method or generating shaping method and further comprising:
   determining eccentricity according to absolute value (e) and phase angle ($C_e$)
      where: e=distance between guiding axis (F) and axis of rotation (D),
      $C_e$=phase angle between the gear and a zero-position on the machine, and
   superimposing corrections on the movements required for machining the gear, whereby with the angle of rotation C=0 lying on the X axis, the corrections are defined as:

$$\Delta C_0 = \Delta C_2 = -\arcsin\frac{e \cdot \sin(C + C_e)}{X_0} \approx \frac{-e \cdot \sin(C + C_e)}{X_0}$$

$\Delta X = e \cdot \cos(C+C_e) - X_0 \cdot (1 - \cos \Delta C_2)$ where:
   $X_0$=distance between tool and gear axes
   Z=position of the tool in the direction of the gear axis
   $C_0$=rotation of the tool
   $C_2$=rotation of the gear.

7. The method of claim 1 wherein the machining method is a profile shaping or generating shaping method and further comprising:
   determining the position of the gear guiding axis (F) relative to the axis of rotation (D) of the machining equipment on the basis of e(Z) and $C_e(Z)$,
      where: Z is a plane perpendicular to the axis of rotation (D),
      $C_e(Z)$ is a phase angle of eccentricity e(Z) in the plane (Z), and
   superimposing corrections on the movements necessary for machining a gear, whereby with the angle of rotation C=0 lying on the X axis, the corrections are defined as:

$$\Delta C_0(Z) = \Delta C_2(Z) = -\arcsin\frac{e(Z)\cdot\sin(C+C_e(Z))}{X_0} \approx \frac{-e(Z)\cdot\sin(C+C_e(Z))}{X_0}$$

$\Delta X(Z) = e(Z)\cdot\cos(C+C_e(Z)) - X_0\cdot(1-\cos\Delta C_2)$ where:

$X_0$=distance between tool and gear axes
Z=position of the tool in the direction of the gear axis
$C_0$=rotation of the tool
$C_2$=rotation of the gear.

8. The method of claim 2 wherein said adjustment data is defined a first coordinate system by the following coordinates:

$X_F$=distance between tool and gear axes
$Y_F$=position of the tool in the direction of its axis
$Z_F$=position of the tool in the direction of the work piece axis
$A_F$=rotation of the tool axis about $X_F$
$B_F$=rotation of the tool about $Y_F$
$C_F$=rotation of the work piece about $Z_F$.

* * * * *